United States Patent
Fu et al.

(10) Patent No.: US 9,502,986 B2
(45) Date of Patent: Nov. 22, 2016

(54) VOLTAGE CONVERSION DEVICE

(71) Applicant: DELTA ELECTRONICS, INC., Taoyuan (TW)

(72) Inventors: Xiao-Ping Fu, Taoyuan (TW); Xing-Hua Zhang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/045,262

(22) Filed: Feb. 17, 2016

(65) Prior Publication Data

US 2016/0308450 A1   Oct. 20, 2016

(30) Foreign Application Priority Data

Apr. 15, 2015   (CN) .......................... 2015 1 0177724

(51) Int. Cl.
H05B 39/00   (2006.01)
H02M 3/335   (2006.01)
H05B 33/08   (2006.01)

(52) U.S. Cl.
CPC ..... *H02M 3/33515* (2013.01); *H05B 33/0815* (2013.01)

(58) Field of Classification Search
CPC .......... H05B 33/0815; H05B 33/0818; H05B 33/0827; H05B 33/0848; H05B 33/0854; H05B 41/2822; H05B 41/3927; H05B 33/0803; H05B 33/0821; H05B 33/0851; H05B 33/089; H02M 3/33561; H02M 3/33569

See application file for complete search history.

(56) References Cited

U.S. PATENT DOCUMENTS

| | | | | |
|---|---|---|---|---|
| 8,729,811 B2* | 5/2014 | Melanson | ............... | H02M 1/36 315/219 |
| 9,101,010 B2* | 8/2015 | Melanson | .......... | H05B 33/0806 |
| 9,173,261 B2* | 10/2015 | Mokry | ............... | H05B 33/0815 |
| 2012/0147494 A1* | 6/2012 | Sase | ...................... | H02M 7/217 360/75 |
| 2012/0230068 A1 | 9/2012 | Augesky et al. | | |
| 2013/0016535 A1* | 1/2013 | Berghegger | ...... | H02M 3/33507 363/21.15 |
| 2014/0022829 A1* | 1/2014 | Shi | ...................... | H02M 1/4258 363/84 |

FOREIGN PATENT DOCUMENTS

| | | |
|---|---|---|
| JP | 2006-020467 A | 1/2006 |
| TW | 560122 B | 11/2003 |
| TW | 201035716 A | 10/2010 |
| TW | I407677 B1 | 9/2013 |
| TW | 201417467 A | 5/2014 |
| TW | M496894 U | 3/2015 |

\* cited by examiner

*Primary Examiner* — Monica C King
(74) *Attorney, Agent, or Firm* — CKC & Partners Co., Ltd.

(57) ABSTRACT

A voltage conversion device includes a voltage conversion unit and a control unit. The voltage conversion unit includes an input rectifier circuit, a storage capacitor, a storage inductor, a transformer, a switch, and a rectifier component. A first end of the storage inductor is electrically coupled to a first output end of the input rectifier circuit. A first end of the transformer is electrically coupled to a second output end of the input rectifier circuit. A second end of the transformer is electrically coupled to a second end of the storage inductor. The switch is electrically coupled to a third end of the transformer. The control unit is configured to provide a control signal to the switch according to a current passing through the switch and at least one of an output voltage and an output current.

20 Claims, 10 Drawing Sheets

US 9,502,986 B2

VOLTAGE CONVERSION DEVICE

RELATED APPLICATIONS

This application claims priority to Chinese Application Serial Number 201510177724.8, filed Apr. 15, 2015, which is herein incorporated by reference.

BACKGROUND

Technical Field

The present disclosure relates to an electronic device. More particularly, the present disclosure relates to a voltage conversion device.

Description of Related Art

With advances in technology, voltage conversion devices have been widely used.

A typical voltage conversion device can convert an AC voltage to a steady DC voltage. The power factor of the voltage conversion device affects the voltage conversion efficiency. A low power factor results in poor voltage conversion efficiency, causing energy to be wasted. In addition, large output ripples of the voltage conversion device limit the applications of the load coupled to the voltage conversion device (e.g., if the load is a light-emitting diode, the ripples may cause flicker).

United States Patent Application Publication No. 2012/0230068 A1 discloses a voltage conversion device capable of adjusting power factor. However, such a patent application is silent with respect to suppress output ripples.

Thus, realization of a voltage conversion device with a high power factor and low output ripples is an important area of research in this field.

SUMMARY

One aspect of the present disclosure is related to a voltage conversion device. In accordance with one embodiment of the present disclosure, the voltage conversion device is configured to provide an output voltage and an output current to a load according to an input voltage. The voltage conversion device includes a voltage conversion unit and a control unit. The voltage conversion unit includes an input rectifier circuit, a storage capacitor, a storage inductor, a transformer, a switch, and a rectifier component. The input rectifier circuit includes an input end, a first output end, a second output end, and a ground end, in which the input end receives the input voltage. The storage capacitor is electrically coupled between the second output end and the ground end of the input rectifier circuit. The storage inductor includes a first end and a second end, in which the first end of the storage inductor is electrically coupled to the first output end of the input rectifier circuit. The transformer includes a first end, a second end, and a third end, in which the transformer has a non-isolation structure, the first end of the transformer is electrically coupled to the second output end of the input rectifier circuit, and the second end of the transformer is electrically coupled to the second end of the storage inductor. The switch is electrically coupled to the third end of the transformer. The rectifier component is electrically coupled between the third end of the transformer and the load. The control unit is electrically coupled to the voltage conversion unit. The control unit is configured to provide a control signal to the switch according to a switch current passing through the switch and at least one of the output voltage and the output current.

In accordance with one embodiment of the present disclosure, the transformer includes a first winding and a second winding. A first end of the first winding is electrically coupled to the second output end of the input rectifier circuit, and a second end of the first winding is electrically coupled to the second end of the storage inductor. A first end of the second winding is electrically coupled to the second end of the first winding, and a second end of the second winding is electrically coupled to the switch. The polarities of the second end of the first winding and the second end of the second winding are identical.

In accordance with one embodiment of the present disclosure, in each time period of the input voltage, a time duration of the input current passing through the storage inductor corresponds to a ratio of turns of the first and second windings.

In accordance with one embodiment of the present disclosure, a power factor of the voltage conversion device corresponds to a ratio of turns of the first and second windings.

In accordance with one embodiment of the present disclosure, the transformer further includes a third winding. A first end of the third winding is electrically coupled to the control unit. A second end of the third winding is electrically coupled to the ground end. The third winding couples to the first winding and the second winding. The polarities of the second end of the first winding, the second end of the second winding, and the first end of the third winding are identical.

In accordance with one embodiment of the present disclosure, the third winding is configured to provide a second sensing signal to the control unit when a current passing through the first winding and a current passing through the second winding are equal to zero, so as to make the control unit accordingly provide the control signal to the switch.

In accordance with one embodiment of the present disclosure, the control unit includes a determining module configured to receive a first sensing signal, a second sensing signal, and a third reference voltage, and output a first trigger signal. Under a case that both of the first sensing signal and the second sensing signal are smaller than the third reference voltage, the first trigger signal has a high voltage level.

In accordance with one embodiment of the present disclosure, the control unit further includes an output module configured to receive the first trigger signal, and turn on the switch when the first trigger signal has the high voltage level.

In accordance with one embodiment of the present disclosure, the control unit includes an output module configured to receive a clock signal and output a control signal, which corresponds to a first trigger signal, according to the clock signal.

In accordance with one embodiment of the present disclosure, the control unit includes a comparator, in which a first end of the comparator is configured to receive a second sensing signal corresponding to the switch current, a second end of the comparator is configured to receive a voltage threshold corresponding to a current threshold, an output end of the comparator is configured to output a second trigger signal, and under a case that the switch current is greater than the current threshold, the second trigger signal has a high voltage level.

In accordance with one embodiment of the present disclosure, the control unit further includes an output module configured to receive the second trigger signal, and turn off the switch when the second trigger signal has a high voltage level.

In accordance with one embodiment of the present disclosure, the control unit further includes an adjusting module configured to adjust the voltage threshold according to at least one of the output voltage and the output current.

In accordance with one embodiment of the present disclosure, the adjusting module includes a sensing circuit and an adjusting circuit. The sensing circuit is configured to determine whether at least one of the output voltage and the output current is greater than a predetermined threshold, and output a determining signal accordingly. The adjusting circuit is configured to adjust the voltage threshold according to the determining signal.

In accordance with one embodiment of the present disclosure, the adjusting circuit includes a voltage source, a current source, a transmitting component, and a receiving component. An anode end of the transmitting component is electrically coupled to the voltage source, and a cathode end of the transmitting component is configured to receive the determining signal and generate a coupling signal. A first end of the receiving component is electrically coupled to the current source, and a second end of the receiving component is coupled to a ground. The receiving component is configured to change a voltage level of the first end of the receiving component according to the coupling signal, and the voltage level of the first end of the receiving component corresponds to the voltage threshold.

In accordance with one embodiment of the present disclosure, the sensing circuit includes a first amplifier, a second amplifier, and an OR-gate circuit. The first amplifier is configured to receive a third sensing signal corresponding to the output current and a first reference voltage, and output a first amplifier signal. The second amplifier is configured to receive a fourth sensing signal corresponding to the output voltage and a second reference voltage, and output a second amplifier signal. The OR-gate circuit is configured to receive the first amplifier signal and the second amplifier signal, perform a logic OR operation on the first amplifier signal and the second amplifier signal to select one of the first amplifier signal and the second amplifier signal, whichever has a lower voltage level, to serve as the determining signal.

In accordance with one embodiment of the present disclosure, the voltage conversion unit further includes an output capacitor electrically coupled between the second output end of the input rectifier circuit and the rectifier component.

In accordance with one embodiment of the present disclosure, the voltage conversion unit further includes an output-voltage-sensing unit configured to sense the output voltage to generate an output-voltage-sensing signal as a fourth sensing signal to provide to the control unit.

In accordance with one embodiment of the present disclosure, the voltage conversion unit further includes an output-current-sensing unit configured to sense the output current to generate an output-current-sensing signal as a third sensing signal to provide to the control unit.

In accordance with one embodiment of the present disclosure, the voltage conversion unit further includes a switch-current-sensing unit configured to sense the current of the switch to generate a second sensing signal, and provide the second sensing signal to the control unit.

In accordance with one embodiment of the present disclosure, the load is a light-emitting diode.

Through utilizing an application of one embodiment described above, a voltage conversion device with a high power factor and low output ripples can be realized.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
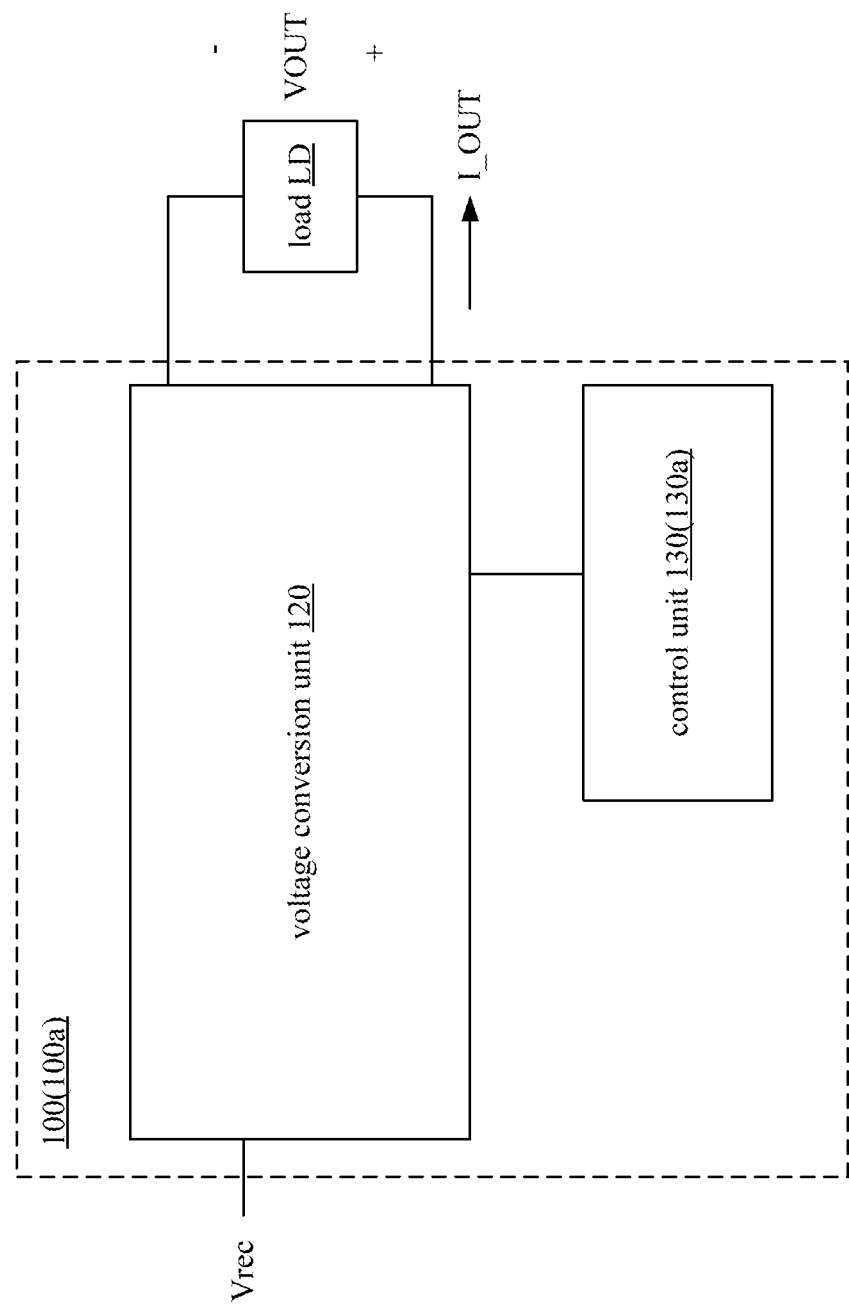
FIG. 1 is a schematic diagram of a voltage conversion device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "electrically coupled" to another element, it can be directly connected or coupled to the other element, or intervening elements may be present. In contrast, when an element is referred to as being "directly connected" to another element, there are no intervening elements present. Moreover, "connect" or "electrically connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

Figure 2:
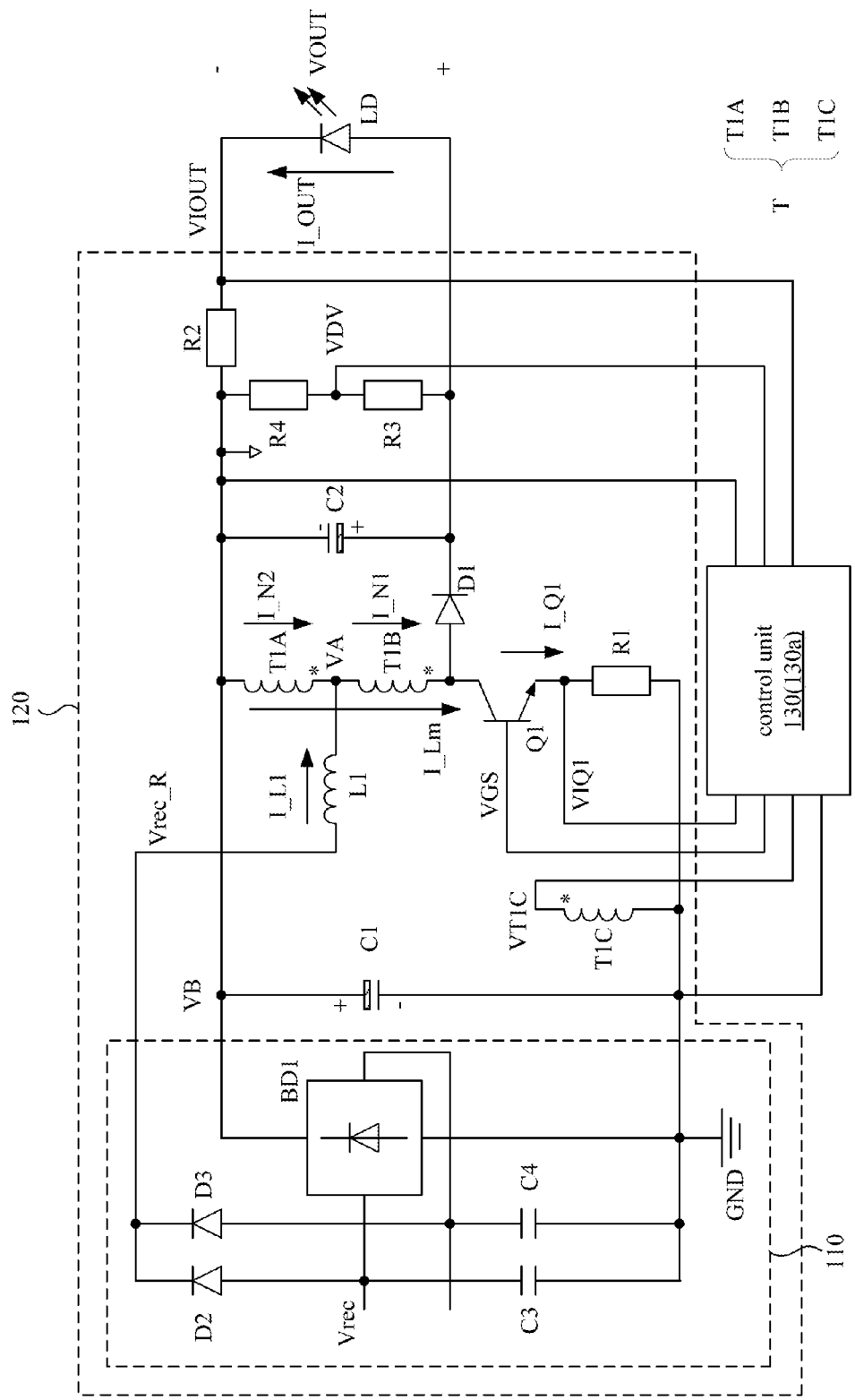
FIG. 2 is a schematic diagram of a voltage conversion device in accordance with one embodiment of the present disclosure.

Reference is made to FIGS. 1 and 2. FIG. 1 is a schematic diagram of a voltage conversion device 100 in accordance with one embodiment of the present disclosure. FIG. 2 is a schematic diagram of a voltage conversion device 100 in accordance with one embodiment of the present disclosure.

In this embodiment, the voltage conversion device 100 is configured to provide an output voltage VOUT and an output current I_OUT to a load LD according to an input voltage Vrec. In one embodiment, the input voltage Vrec may be an AC voltage. In one embodiment, the output voltage VOUT may be a DC voltage. In one embodiment, the load LD may be a light-emitting diode.

In this embodiment, the voltage conversion device 100 includes a voltage conversion unit 120 and a control unit 130. The voltage conversion unit 120 and the control unit 130 are electrically coupled to each other.

Particular reference is made to FIG. 2. In this embodiment, the voltage conversion unit 120 includes an input rectifier circuit 110, a storage capacitor C1, an output capacitor C2, a storage inductor L1, a transformer T, a switch Q1, a switch-current-sensing unit (e.g., a resistor R1), an output-current-sensing unit (e.g., a resistor R2), an output-voltage-sensing unit (e.g., resistors R3, R4), and a rectifier component D1 (e.g., a diode).

In this embodiment, the input end of the input rectifier circuit 110 is configured to receive the input voltage Vrec. The first output end (e.g., the end outputting the voltage Vrec_R) of the input rectifier circuit 110 is electrically coupled to the transformer T. The second output end (e.g., the end outputting the voltage VB) of the input rectifier circuit 110 is electrically coupled to the transformer T and the storage capacitor C1. The ground end of the input rectifier circuit 110 is electrically coupled to ground GND.

In one embodiment, the input rectifier circuit 110 may include a bridge rectifier BD1, diodes D2, D3, and capacitors C3, C4. In one embodiment, the bridge rectifier BD1 is electrically coupled to a live wire and a neutral wire used for transmitting the input voltage Vrec and electrically coupled between the second output end and the ground end of the input rectifier circuit 110. The diode D2 is electrically coupled between the live wire used for transmitting the input voltage Vrec and the first output end of the input rectifier circuit 110. The diode D3 is electrically coupled between the neutral wire used for transmitting the input voltage Vrec and the first output end of the input rectifier circuit 110. The capacitor C3 is electrically coupled between the live wire used for transmitting the input voltage Vrec and the ground end of the input rectifier circuit 110. The capacitor C4 is electrically coupled between the neutral wire used for transmitting the input voltage Vrec and the ground end of the input rectifier circuit 110.

In this embodiment, the storage capacitor C1 is electrically coupled between the second output end and the ground end of the input rectifier circuit 110. A first end of the storage inductor L1 is electrically coupled to a first output end of the input rectifier circuit 110. A second end of the storage inductor L1 is electrically coupled to the transformer T.

In this embodiment, the transformer T has a non-isolation structure. A first end of the transformer T is electrically coupled to the second output end of the input rectifier circuit 110. A second end of the transformer T is electrically coupled to the second end of the storage inductor L1. A third end of the transformer T is electrically coupled to the switch Q1.

In one embodiment, the transformer T may include a first winding T1A, a second winding T1B, and a third winding T1C. In one embodiment, a first end of the first winding T1A serves as the first end of the transformer T. A second end of the first winding T1A serves as the second end of the transformer T and electrically couples to a first end of the second winding T1B. A second end of the second winding T1B serves as the third end of the transformer T. A first end of the third winding T1C is electrically coupled to the control unit 130. A second end of the third winding T1C is electrically coupled to ground GND.

In one embodiment, the polarities of the second end of the first winding T1A, the second end of the second winding T1B, and the first end of the third winding T1C are identical.

In this embodiment, the first end of the switch Q1 is electrically coupled to the third end of the transformer T. The second end of the switch Q1 is electrically coupled to a first end of the switch-current-sensing unit (e.g., the resistor R1). The control end of the switch Q1 is electrically coupled to the control unit 130. The first end of the switch-current-sensing unit (e.g., the resistor R1) is electrically coupled to the second end of the switch Q1, and the second end of the switch-current-sensing unit is electrically coupled to ground GND. An anode end of the rectifier component D1 is electrically coupled to the third end of the transformer T. A cathode end of the rectifier component D1 is electrically coupled to the load LD. The output capacitor C2 is electrically coupled between the second output end of the input rectifier circuit 110 and the cathode end of the rectifier component D1. The output-current-sensing unit (e.g., the resistor R2) is electrically coupled between the load and the second output end of the rectifier circuit 110. The output-voltage-sensing unit (e.g., the resistors R3, R4) is electrically coupled between the cathode end of the rectifier component D1 and the second output end of the rectifier circuit 110, and electrically coupled to the control unit 130.

In this embodiment, the switch-current-sensing unit (e.g., the resistor R1) is configured to sense a current I_Q1 passing through the switch Q1 to generate a switch-current-sensing signal VIQ1 corresponding to the current I_Q1, and provide the switch-current-sensing signal VIQ1 to the control unit 130.

In this embodiment, the output-current-sensing unit (e.g., the resistor R2) is configured to sense the output current I_OUT to generate an output-current-sensing signal VIOUT corresponding to the output current I_OUT, and provide the output-current-sensing signal VIOUT to the control unit 130.

In this embodiment, the output-voltage-sensing unit (e.g., the resistors R3, R4) is configured to sense the output voltage VOUT to generate an output-voltage-sensing signal VDV corresponding to the output voltage VOUT, and provide the output-voltage-sensing signal VDV to the control unit 130.

In this embodiment, the third winding T1C is configured to sense a current I_N2 passing through the first winding T1A and a current I_N1 passing through the second winding T1B, and provide a sensing signal VT1C corresponding to the current I_N2 passing through the first winding T1A and the current I_N1 passing through the second winding T1B to the control unit 130.

In this embodiment, the control unit 130 is configured to provide a control signal VGS to the control end of the switch Q1 according to a current I_Q1 passing through the switch Q1, the sensing signal VT1C, and at least one of the output-current-sensing signal VIOUT and the output-voltage-sensing signal VDV, so as to turn on or off the switch Q1.

In such a configuration, the effect caused by the ripples of the input voltage Vrec on the output voltage VOUT can be suppressed.

Figure 3B:
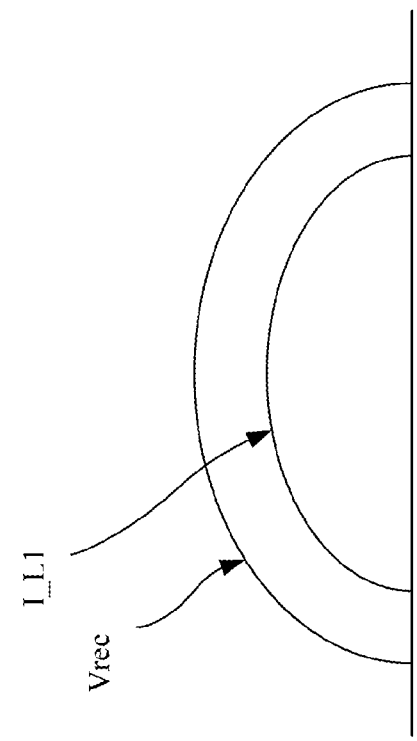
FIG. 3B illustrates an input voltage-current relationship in accordance with one illustrative example.
Figure 3A:
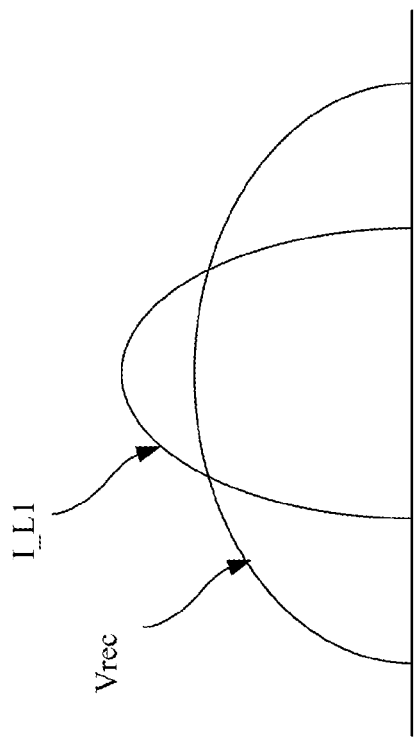
FIG. 3A illustrates an input voltage-current relationship in accordance with one illustrative example.

In the voltage conversion unit 120, the input current I_L1 passes through the storage inductor L1 only when the voltage Vrec_R on the first end of the storage inductor L1 is greater than the voltage VA on the second end of the storage inductor L1. The voltage VA on the second end of the storage inductor L1 corresponds to a ratio of turns of the first and second windings T1A, T1B. FIGS. 3A and 3B illustrate input voltage-current relationships in accordance with one illustrative example. As illustrated in FIG. 3A, the greater the ratio of turns of the first and second windings T1A, T1B is, the lower the voltage VA on the second end of the storage inductor L1 is, the longer the duration of the input current I_L1 passing through the storage inductor L1 in each time period of the input voltage is, the more similar the waveforms of the input current I_L1 and the input voltage Vrec are, and the greater the power factor of the voltage conversion device 100 is. On the other hand, as illustrated in FIG. 3B, the lower the ratio of turns of the first and second windings T1A, T1B (e.g., lower than in the case of FIG. 3A) is, the greater the voltage VA on the second end of the storage inductor L1 is, the shorter the duration of the input current I_L1 passing through the storage inductor L1 in each time period of the input voltage (e.g., shorter than the counterpart in FIG. 3A) is, the less similar the waveforms of the input current I_L1 and the input voltage Vrec are, and the lower the power factor of the voltage conversion device 100 is.

In other words, in each time period of the input voltage, the duration of the input current I_L1 passing through the storage inductor L1 corresponds to a ratio of turns of the first and second windings T1A, T1B, and the power factor of the voltage conversion device 100 corresponds to the ratio of turns of the first and second windings T1A, T1B.

Thus, by using one embodiment of the present disclosure, with a high ratio of turns of the first and second windings T1A, T1B, a voltage conversion device having a high power factor and low output ripples can be realized.

Figure 4:
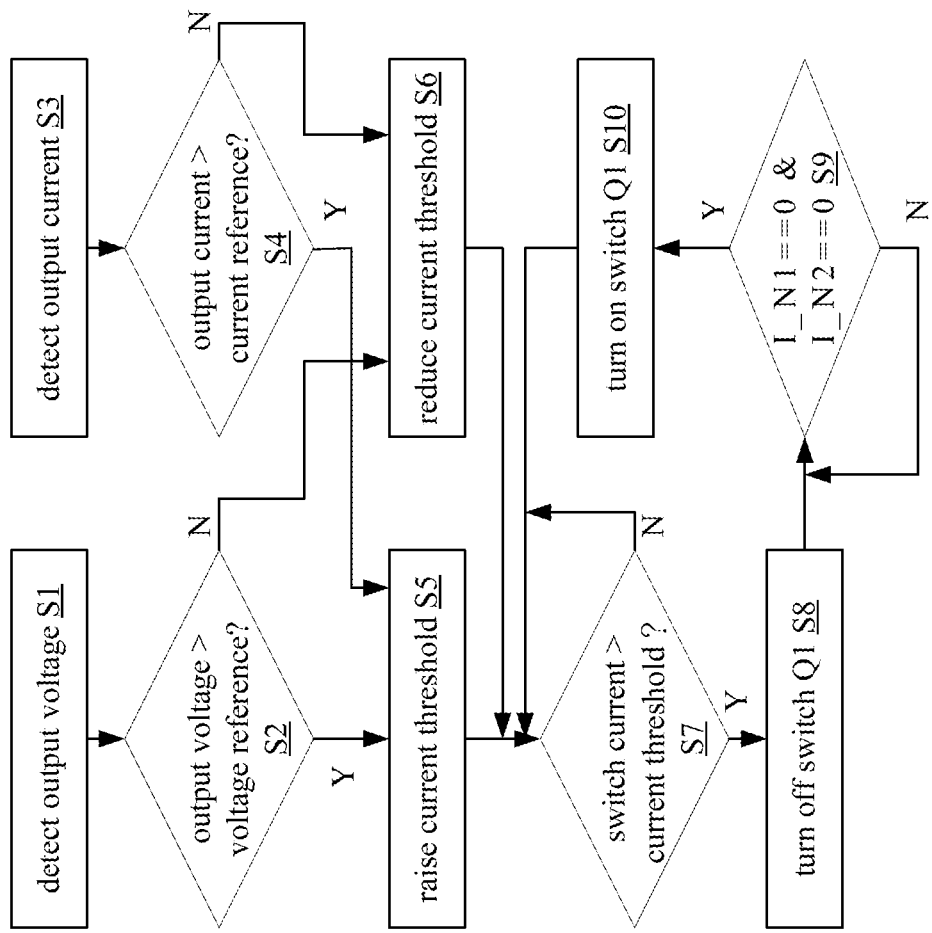
FIG. 4 is a flowchart of an operating method of a control unit in accordance with one embodiment of the present disclosure.

FIG. 4 is a flowchart of an operating method 200 of a control unit 130 in accordance with one embodiment of the present disclosure.

In step S1, the control unit 130 detects the output voltage VOUT.

Figure 6:
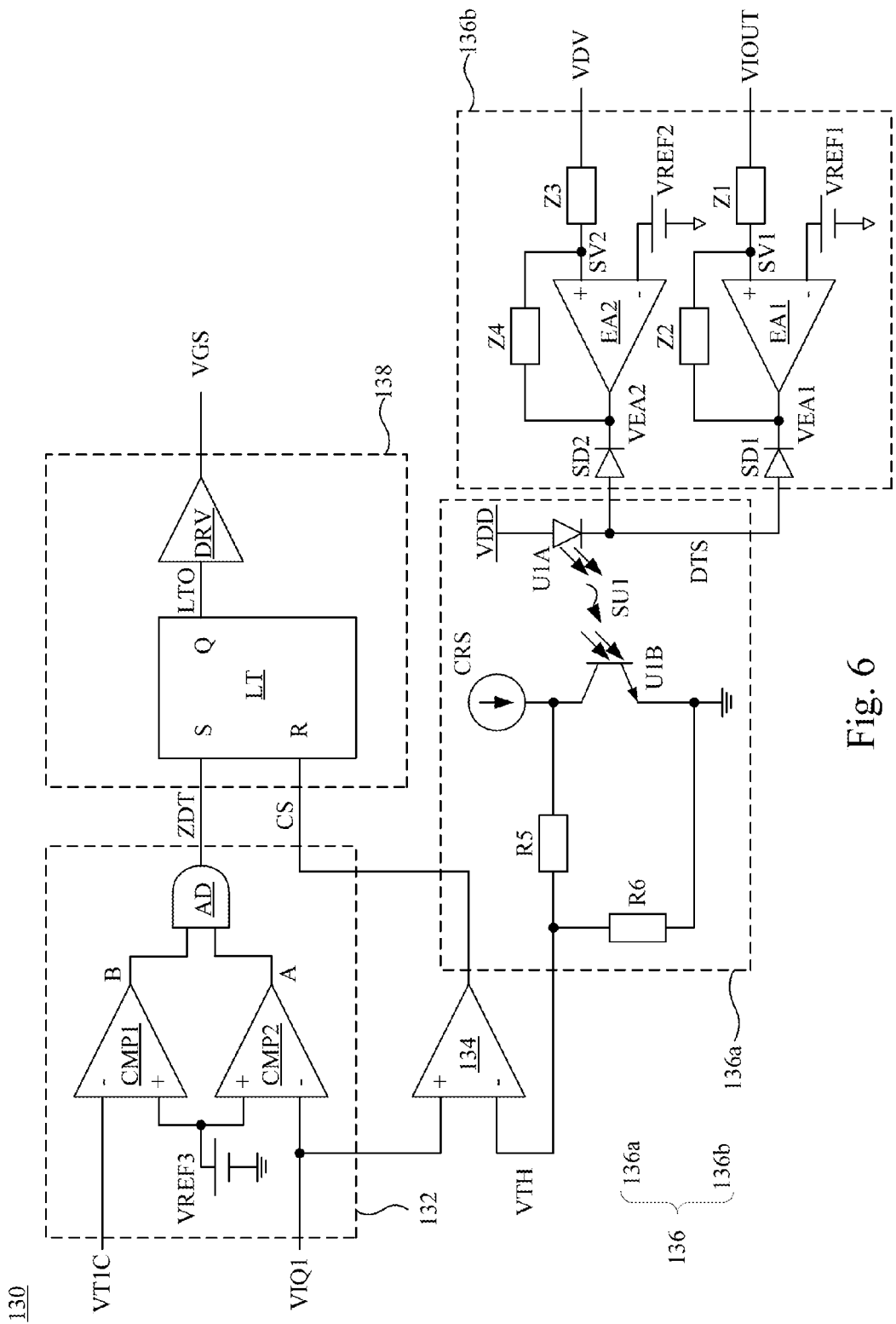
FIG. 6 is a schematic diagram of part of a control unit in accordance with one embodiment of the present disclosure.

In step S2, the control unit 130 determines whether the output voltage VOUT is greater than a voltage reference (corresponding to the reference voltage VREF2 in FIG. 6). If so, step S5 is performed. If not, step S6 is performed.

In step S3, the control unit 130 detects the output current I_OUT.

In step S4, the control unit 130 determines whether the output current I_OUT is greater than a current reference (corresponding to the reference voltage VREF1 in FIG. 6). If so, step S5 is performed. If not, step S6 is performed.

In step S5, under a condition that the output voltage VOUT is greater than the voltage reference or the output current I_OUT is greater than the current reference, the control unit 130 raises a current threshold.

In step S6, under a condition that the output voltage VOUT is not greater than the voltage reference or the output current I_OUT is not greater than the current reference, the control unit 130 reduces the current threshold.

In step S7, the control unit 130 determines whether the switch current I_Q1 is greater than the current threshold. If so, step S8 is performed. If not, the control unit 130 continuously determines whether the switch current I_Q1 is greater than the current threshold.

In step S8, the control unit 130 turns off the switch Q1.

In step S9, the control unit 130 determines whether both of the current I_N2 passing through the first winding T1A and the current I_N1 passing through the second winding T1B are zero. If so, step 310 is performed. If not, the control unit 130 continuously determines whether both of the current I_N2 passing through the first winding T1A and the current I_N1 passing through the second winding T1B are zero.

In step 310, the control unit 130 turns on the switch Q1.

Through the operations described above, the control unit 130 can provide the control signal VGS to the control end of the switch Q1 according to the current I_Q1 passing through the switch Q1, the current I_N2 passing through the first winding T1A and the current I_N1 passing through the second winding T1B, and at least one of the output voltage VOUT and the output current I_OUT, so as to turn on or off the switch Q1.

It should be noted that, in some embodiments, the control unit 130 may adjust the current threshold according to merely one of the output voltage VOUT and the output current I_OUT, and the present disclosure is not limited to the embodiment described above.

Figure 5:
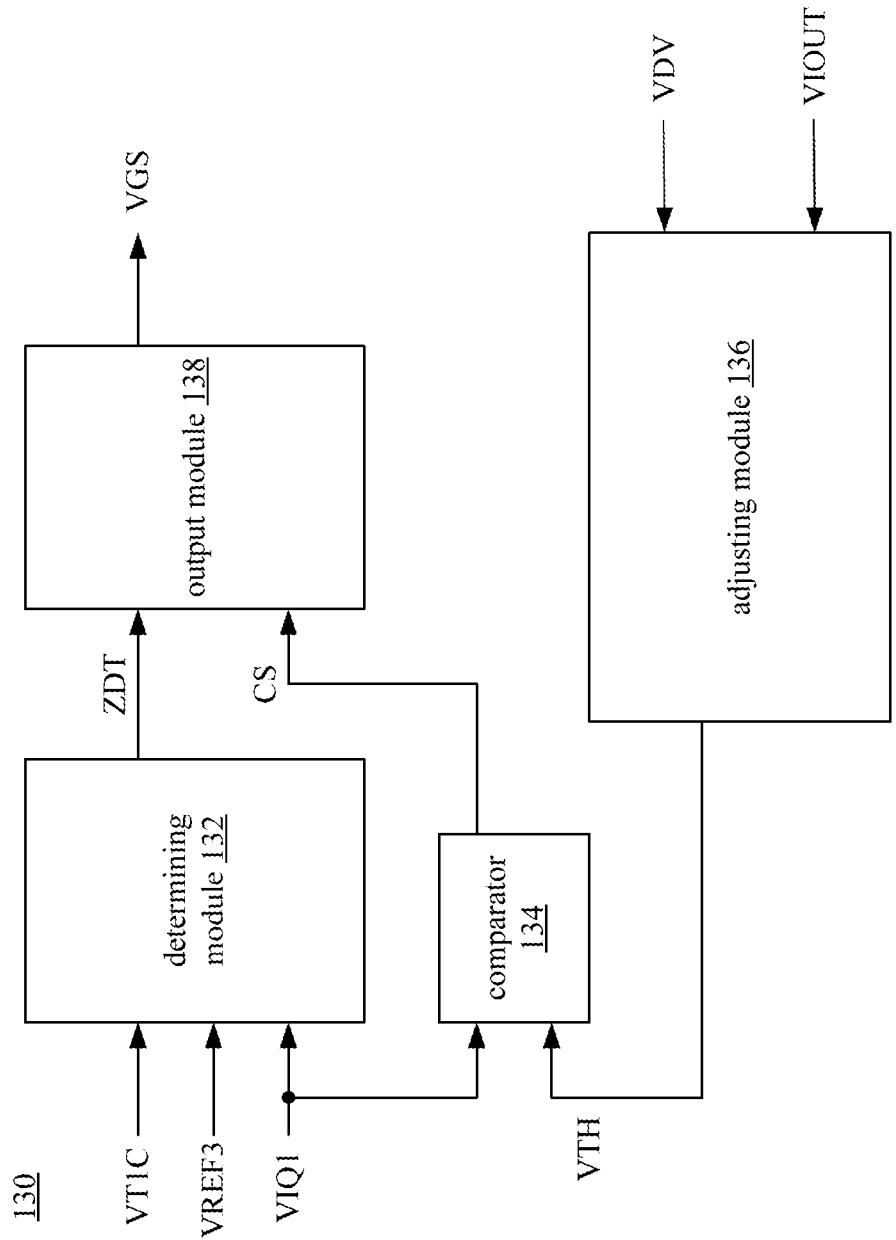
FIG. 5 is a schematic diagram of a control unit in accordance with one embodiment of the present disclosure.

Reference is made to FIG. 5, which is a schematic diagram of the control unit 130 in accordance with one embodiment of the present disclosure. In one embodiment, the control unit 130 may include a determining module 132, a comparator 134, an adjusting module 136, and an output module 138. In this embodiment, the determining module 132 is electrically coupled to the output module 138. The comparator 134 is electrically coupled to the output module 138. The adjusting module 136 is electrically coupled to the comparator 134.

In this embodiment, the determining module 132 is configured to receive the sensing signal VT1C, the switch-current-sensing signal VIQ1, and a reference VREF3, and accordingly outputs a first trigger signal ZDT. For example, when both of the sensing signal VT1C and the switch-current-sensing signal VIQ1 are lower than the reference VREF3, the first trigger signal ZDT has a high voltage level. While when one of the sensing signal VT1C and the switch-current-sensing signal VIQ1 is greater than the reference VREF3, the first trigger signal ZDT has a low voltage level.

In this embodiment, the adjusting module 136 is configured to adjust and output the voltage threshold VTH according to at least one of the output voltage VOUT and the output current I_OUT. In this embodiment, the adjusting module 136 receives the output-voltage-sensing signal VDV corresponding to the output voltage VOUT and the output-current-sensing signal VIOUT corresponding to the output current I_OUT, and accordingly adjusts the voltage threshold VTH.

In this embodiment, the comparator 134 is configured to determine whether the switch current IQ1 is greater than a current threshold corresponding to the voltage threshold VTH. A first end of the comparator 134 is configured to receive the switch-current-sensing signal VIQ1, a second end of the comparator 134 is configured to receive the voltage threshold VTH from the adjusting module 136, and an output end of the comparator 134 is configured to output a second trigger signal CS. For example, under a condition that the switch current I_Q1 is greater than the current threshold, the second trigger signal CS has a high voltage level. Under a condition that the switch current IQ1 is not greater than the current threshold, on the other hand, the second trigger signal CS has a low voltage level.

In this embodiment, the output module 138 is configured to receive the first trigger signal ZDT and the second trigger signal CS, and accordingly control the switch Q1 to turn on or off. For example, under a condition that the first trigger signal ZDT has a high voltage level, the output module 138 outputs the control signal VGS with a high voltage level, so as to control the switch Q1 to turn on. Under a condition that the second trigger signal CS has a high voltage level, the output module 138 outputs the control signal VGS with a low voltage level, so as to control the switch Q1 to turn off.

In the paragraphs below, details of the determining module 132, the comparator 134, the adjusting module 136, and the output module 138 will be described with reference to FIG. 6. However, the present disclosure is not limited to the embodiment below.

In one embodiment, the determining module 132 includes comparators CMP1, CMP2, and an AND-gate AD. The negative input end of the comparator CMP1 is configured to receive the sensing signal VT1C. The positive input end of the comparator CMP1 is configured to receive the reference voltage VREF3. The output end of the comparator CMP1 is configured to output an output signal B. The negative input end of the comparator CMP2 is configured to receive the switch-current-sensing signal VIQ1. The positive input end of the comparator CMP2 is configured to receive the reference voltage VREF3. The output end of the comparator CMP2 is configured to output an output signal A. Two input ends of the AND-gate AD are configured to respectively receive the signals A, B. When both of the signals A, B have high voltage levels, the AND-gate AD outputs the first trigger signal ZDT with a high voltage level.

That is, the determining module 132 outputs the first trigger signal ZDT with a high voltage level when both of the sensing signal VT1C and the switch-current-sensing signal VIQ1 are lower than the reference voltage VREF3. When the reference voltage VREF3 is configured as a voltage with a value slightly greater than 0, the determining module 132 can output the first trigger signal ZDT with a high voltage level when both of the sensing signal VT1C and the switch-current-sensing signal VIQ1 are 0.

In one embodiment, the adjusting module 136 includes a sensing circuit 136b and an adjusting circuit 136a. The sensing circuit 136b and the adjusting circuit 136a are electrically coupled to each other. The sensing circuit 136b is configured to determine whether at least one of the output voltage VOUT and the output current I_OUT is greater than a predetermined threshold, and output a determining signal DTS accordingly. The adjusting circuit 136a is configured to adjust the voltage threshold VTH according to the determining signal DTS.

In one embodiment, the sensing circuit 136b includes impedances Z1-Z4, amplifiers EA1, EA2, and an OR-gate including diodes SD1, SD2. In this embodiment, the first input end of the amplifier EA1 is configured to receive the reference voltage VREF1, and the second input end of the amplifier EA1 is configured to receive the output-current-sensing signal VIOUT via the impedance Z1, and is electrically coupled to the output end of the amplifier EA1 via the impedance Z2. The output end of the amplifier EA1 is electrically coupled to a cathode end of the diode SD1. The first input end of the amplifier EA2 is configured to receive the reference voltage VREF2, and the second input end of the amplifier EA2 is configured to receive the output-voltage-sensing signal VDV via the impedance Z3, and is electrically coupled to the output end of the amplifier EA2 via the impedance Z4. The output end of the amplifier EA2 is electrically coupled to a cathode end of the diode SD2. The anode ends of the diodes SD1, SD2 are electrically coupled to the adjusting circuit 136a.

In this embodiment, the amplifier EA1 is configured to receive the output-current-sensing signal VIOUT (e.g., voltage SV1) corresponding to the output current I_OUT and a reference voltage VREF1, and output an amplifier signal VEA1. The amplifier EA2 is configured to receive the output-voltage-sensing signal VDV (e.g., voltage SV2) corresponding to the output voltage VOUT and a reference voltage VREF2, and output an amplifier signal VEA2. The OR-gate circuit (e.g., including the diodes SD1, SD2) is configured to receive the amplifier signals VEA1, VEA2. The OR-gate circuit is configured to perform a logic OR operation on the first amplifier signal VEA1 and the second amplifier signal VEA2 to select one of the first amplifier signal VEA1 and the second amplifier signal VEA2, whichever has a lower voltage level, to serves as the determining signal DTS.

In one embodiment, the adjusting circuit 136a includes a voltage source VDD, a current source CRS, a transmitting component U1A, a receiving component U1B, and resistors R5, R6. In this embodiment, an anode end of the transmitting component U1A is electrically coupled to the voltage source VDD, and a cathode end of the transmitting component U1A is configured to receive the determining signal DTS and accordingly generate a coupling signal SU1. A first end of the receiving component U1B is electrically coupled to the current source CRS, and a second end of the receiving component U1B is coupled to ground. The receiving component U1B is configured to change a voltage level of the first end of the receiving component U1B according to the coupling signal SU1, in which the voltage level of the first end of the receiving component U1B corresponds to the voltage threshold VTH. The resistor R5 is electrically coupled between the first end of the receiving component U1B and the comparator 134. The resistor R6 is electrically coupled between the second end of the receiving component U1B and the comparator 134.

In one embodiment, the transmitting component U1A and the receiving component U1B are optical couplers, but the present disclosure is not limited in this regard.

In one embodiment, the positive input end of the comparator 134 is configured to receive the switch-current-sensing signal VIQ1, the negative input end of the comparator 134 is configured to receive the voltage threshold VTH, and the output end of the comparator 134 is configured to output the second trigger signal CS.

In one embodiment, the output module 138 includes an SR-latch LT and a driver DRV. An input end S of the SR-latch LT is configured to receive the first trigger signal ZDT, an input end R of the SR-latch LT is configured to receive the second trigger signal CS, and an output end Q of the SR-latch LT is configured to output a signal LTO to the driver DRV. The driver DRV is configured to generate the control signal VGS according to the signal LTO.

Figure 7:
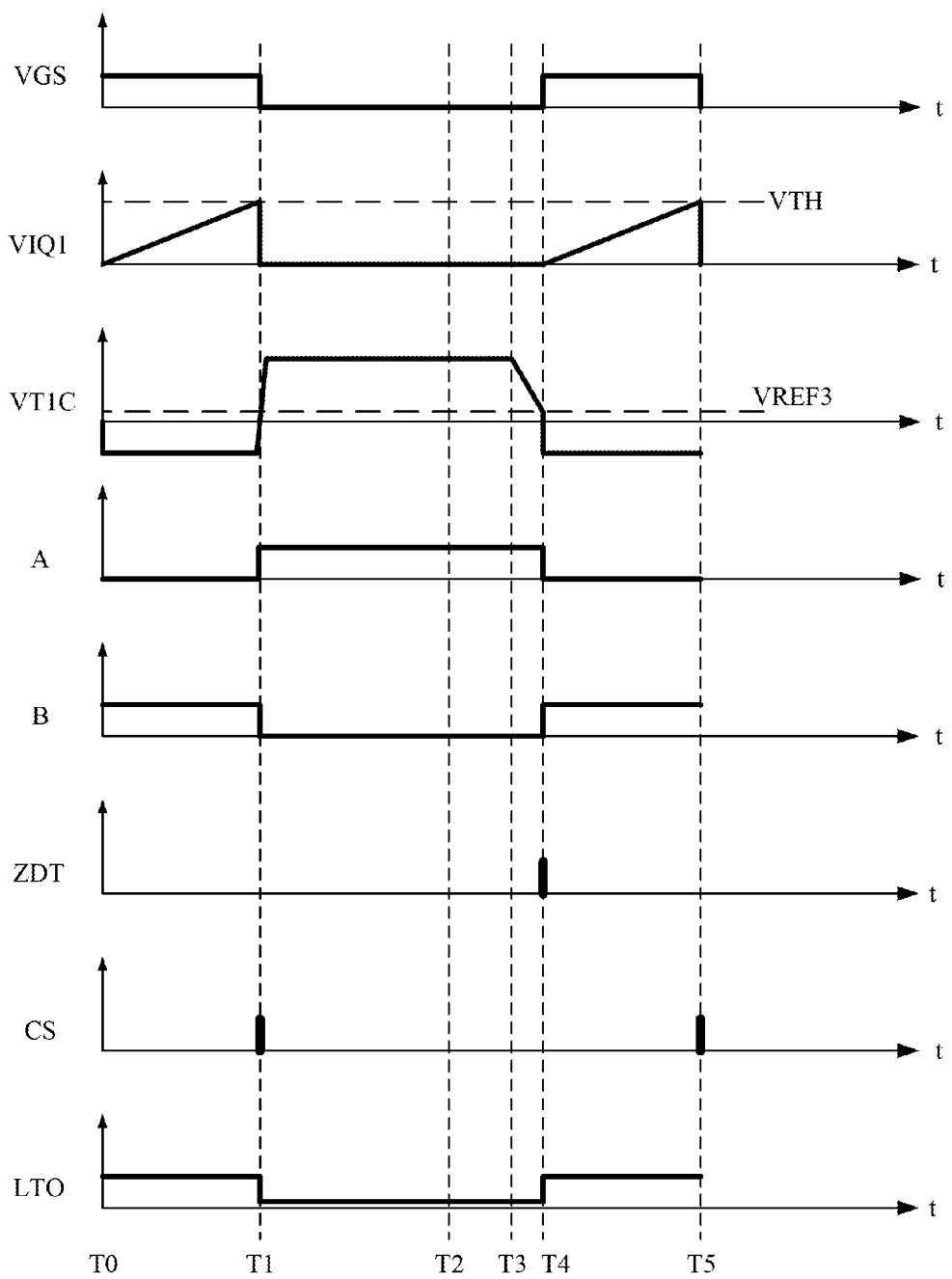
FIG. 7 illustrates signals of the control unit in accordance with one embodiment of the present disclosure.

FIG. 7 illustrates signals waveform of the control unit 130 in accordance with one embodiment of the present disclosure.

At time point TO, the switch-current-sensing signal VIQ1 has a low voltage level, the sensing signal VT1C has a negative voltage level, and the signal LTO has a high voltage level.

At time point T1, since the switch-current-sensing signal VIQ1 received by the positive input end of the comparator 134 is greater than the voltage threshold VTH received by the negative input end of the comparator 134, the second trigger signal CS outputted by the comparator 134 has a high voltage level, so that the signal LTO and the control signal VGS are converted to low voltage levels, and the switch Q1 is switched off.

At time point T4, the switch-current-sensing signal VIQ1 has a low voltage level, and the sensing signal VT1C is decreased to a zero voltage level from a positive voltage level. At this time, since both of the switch-current-sensing signal VIQ1 and the sensing signal VT1C are lower than the reference voltage VREF3, the first trigger signal ZDT outputted by the determining module 132 has a high voltage level. Also, at this time, since the second trigger signal CS outputted by the comparator 134 has a low voltage level, the signal LTO and the control signal VGS are converted to a high voltage level, and the switch Q1 is turned on. After the switch Q1 is turned on, the current passing through the switch Q1 is increased, and the switch-current-sensing signal VIQ1 is higher than the reference voltage VREF3, the signal A is converted to a low voltage level from a high voltage level, the first trigger signal ZDT is converted to a low voltage level, the second trigger signal CS continues to stay at a low voltage level, so that the signal LTO has a high voltage level, the control signal VGS has a high voltage level, and the switch Q1 continues to be on.

When the switch Q1 turns on, the current passing through the switch Q1 is increased and the switch-current-sensing signal VIQ1 is also correspondingly increased. When the switch-current-sensing signal VIQ1 is increased to the voltage threshold VTH at, for example, time point T5, the signal LTO and the control signal VGS are converted to low voltage levels, and the switch Q1 is switched off. Subsequently, the circuit will repeat the operations from time point TO to time point T4 as described above, and a description in this regard will not be repeated herein.

In the following paragraphs, a voltage conversion device 100a in another embodiment of the present disclosure is described with reference to FIGS. 8-10. The voltage conversion device 100a includes a voltage conversion unit 120 and a control unit 130a. The voltage conversion unit 120 of the voltage conversion device 100a is substantially identical to the voltage conversion unit 120 of the voltage conversion device 100 in the embodiment described above, and a description in this regard will not be repeated herein.

Figure 8:
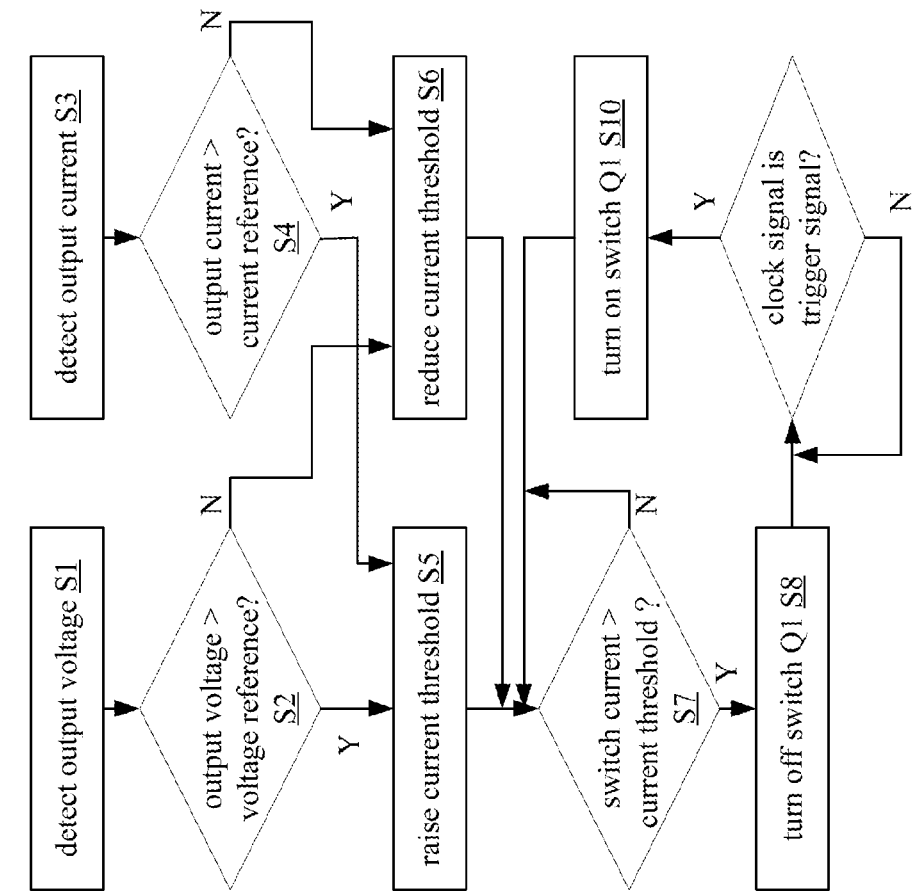
FIG. 8 is a flowchart of an operating method of a control unit in accordance with one embodiment of the present disclosure.

FIG. 8 is a flowchart of an operating method 200a of a control unit 130a in accordance with one embodiment of the present disclosure.

In step S1, the control unit 130a detects the output voltage VOUT.

In step S2, the control unit 130a determines whether the output voltage VOUT is greater than a voltage reference. If so, step S5 is performed. If not, step S6 is performed.

In step S3, the control unit 130a detects the output current I_OUT.

In step S4, the control unit 130a determines whether the output current I_OUT is greater than a current reference. If so, step S5 is performed. If not, step S6 is performed.

In step S5, under a condition that the output voltage VOUT is greater than the voltage reference, or the output current I_OUT is greater than the current reference, the control unit 130a raises a current threshold.

In step S6, under a condition that the output voltage VOUT is not greater than the voltage reference, or the output current I_OUT is not greater than the current reference, the control unit 130a reduces the current threshold.

In step S7, the control unit 130a determines whether the switch current I_Q1 is greater than the current threshold. If so, step S8 is performed. If not, the control unit 130a continuously determines whether the switch current I_Q1 is greater than the current threshold.

In step S8, the control unit 130a turns off the switch Q1.

In step S9a, the control unit 130a determines whether a clock signal CLK internally generated by itself is a trigger signal. If so, step S10 is performed. If not, the control unit 130a continuously determines whether the internally generated clock signal CLK is a trigger signal.

In step S10, the control unit 130a turns on the switch Q1.

Through the operations described above, the control unit 130a can provide the control signal VGS to the control end of the switch Q1 according to the switch current I_Q1 passing through the switch Q1, the internally generated clock signal CLK, and at least one of the output-current-sensing signal VIOUT and the output-voltage-sensing signal VDV, so as to turn on or off the switch Q1.

It should be noted that, in some embodiments, the control unit 130a may adjust the current threshold according to merely one of the output voltage and the output current I_OUT, and the present disclosure is not limited to the embodiment described above.

Figure 9:
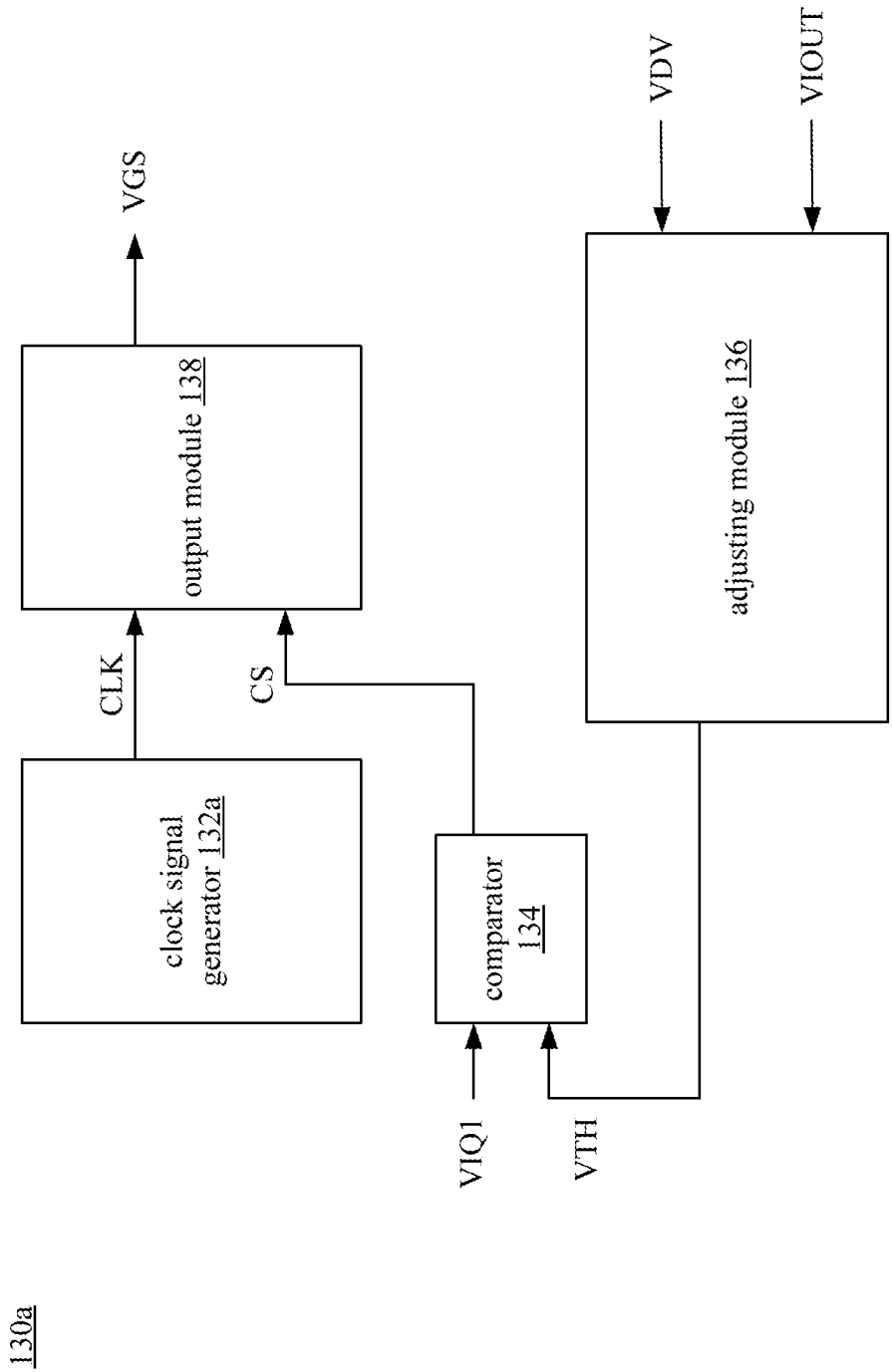
FIG. 9 is a schematic diagram of a control unit in accordance with one embodiment of the present disclosure.

Reference is made to FIG. 9, which is a schematic diagram of the control unit 130a in accordance with one embodiment of the present disclosure. In one embodiment, the control unit 130a may include a clock signal generator 132a, a comparator 134, an adjusting module 136, and an output module 138. In this embodiment, the determining module 132 is electrically coupled to the output module 138. In this embodiment, the clock signal generator 132a is electrically coupled to the output module 138, the comparator 134 is electrically coupled to the output module 138, and the adjusting module 136 is electrically coupled to the comparator 134.

In this embodiment, the clock signal generator 132a is configured to generate the clock signal CLK. In this embodiment, the clock signal has a period Ts.

In this embodiment, the adjusting module 136 is configured to adjust the voltage threshold VTH according to at least one of the output voltage VOUT and the output current I_OUT, and output the voltage threshold VTH. In this embodiment, the adjusting module 136 receives the output-voltage-sensing signal VDV corresponding to the output voltage VOUT and the output-current-sensing signal VIOUT corresponding to the output current I_OUT, and accordingly adjusts the voltage threshold VTH.

In this embodiment, the comparator 134 is configured to determine whether the switch current I_Q1 is greater than a current threshold corresponding to the voltage threshold VTH. A first end of the comparator 134 is configured to receive the switch-current-sensing signal VIQ1, a second end of the comparator 134 is configured to receive the voltage threshold VTH from the adjusting module 136, and an output end of the comparator 134 is configured to output a second trigger signal CS. For example, under a condition that the switch current I_Q1 is greater than the current threshold, the second trigger signal CS has a high voltage level. On the other hand, under a condition that the switch current I_Q1 is not greater than the current threshold, the second trigger signal CS has a low voltage level.

In this embodiment, the output module 138 is configured to receive the clock signal CLK and the second trigger signal CS, and accordingly control the switch Q1 to turn on or off. For example, under a condition that the clock signal CLK has a high voltage level, the output module 138 outputs the control signal VGS with a high voltage level, so as to control the switch Q1 to turn on. Under a condition that the second trigger signal CS has a high voltage level, the output module 138 outputs the control signal VGS with a low voltage level, so as to control the switch Q1 to turn off.

It should be noted that details of the comparator 134, the adjusting module 136, and the output module 138 can be ascertained with reference to the paragraphs described above, and a description in this regard will not be repeated herein.

Figure 10:
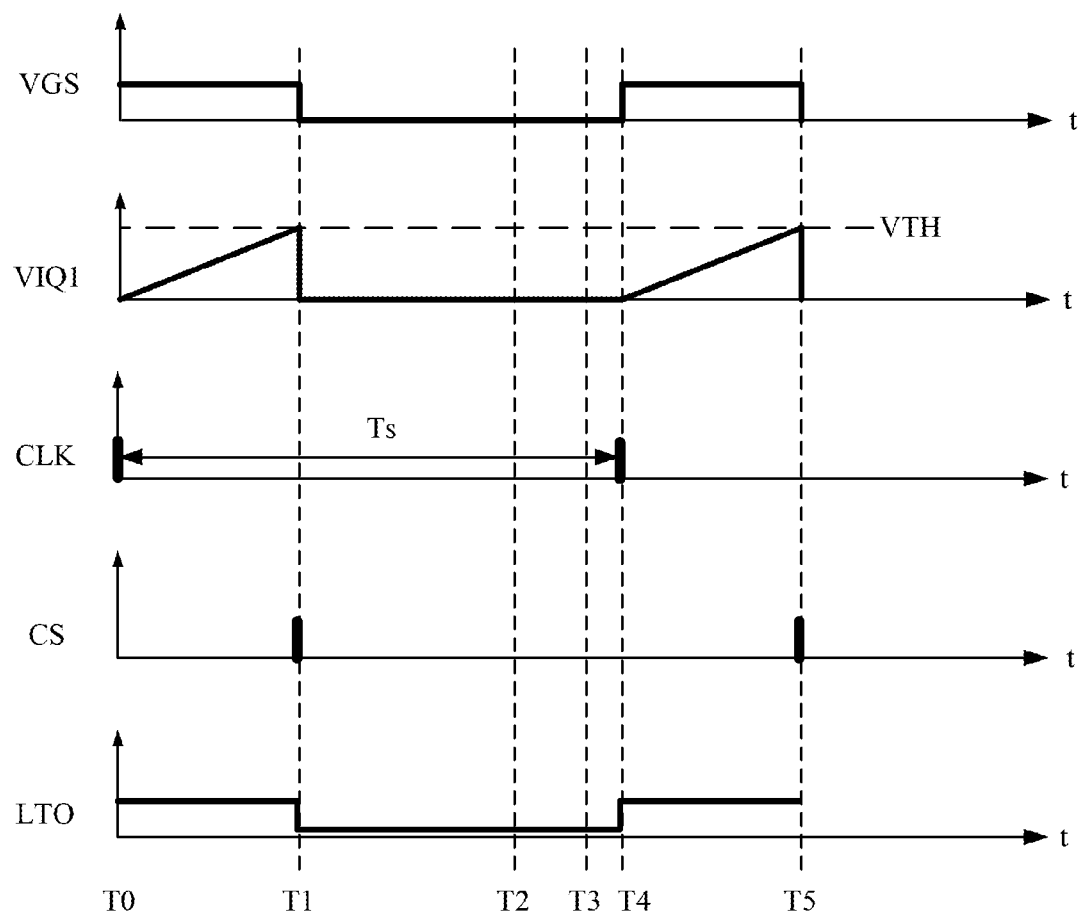
FIG. 10 illustrates signals of the control unit in accordance with one embodiment of the present disclosure.

FIG. 10 illustrates signals waveform of the control unit 130a in accordance with one embodiment of the present disclosure.

At time point T0, the switch-current-sensing signal VIQ1 has a low voltage level, the clock signal CLK outputted by the clock signal generator 132a is a trigger signal (as shown in FIG. 10, the trigger signal is an impulse), and the signal LTO and the control signal VGS have high voltage levels.

At time point T1, since the switch-current-sensing signal VIQ1 received by the positive input end of the comparator 134 is greater than the voltage threshold VTH received by the negative input end of the comparator 134, the second trigger signal CS outputted by the comparator 134 has a high voltage level, so that the signal LTO and the control signal VGS are converted to low voltage levels, and the switch Q1 is turned off.

At time point T4, the switch Q1 is turned on, and the switch-current-sensing signal VIQ1 has a low voltage level, the second trigger signal CS outputted by the comparator 134 has a low voltage level, and the clock signal CLK is a trigger signal, so that the signal LTO and the control signal VGS are converted to high voltage levels. After the switch Q1 is turned on, the clock signal CLK returns back to a low voltage level, and the second trigger signal CS continues to stay at a low voltage level, so that the signal LTO and the control signal VGS have high voltage levels, and the switch Q1 is turned on. Subsequently, the circuit will repeat the operations from time point T0 to time point T4 as described above, and a description in this regard will not be repeated herein.

Although the present invention has been described in considerable detail with reference to certain embodiments thereof, other embodiments are possible. Therefore, the scope of the appended claims should not be limited to the description of the embodiments contained herein.

What is claimed is:

1. A voltage conversion device configured to provide an output voltage and an output current to a load according to an input voltage, the voltage conversion device comprising:
    a voltage conversion unit comprising:
        an input rectifier circuit comprising an input end, a first output end, a second output end, and a ground end, wherein the input end receives the input voltage;
        a storage capacitor electrically coupled between the second output end and the ground end of the input rectifier circuit;
        a storage inductor comprising a first end and a second end, wherein the first end of the storage inductor is electrically coupled to the first output end of the input rectifier circuit;
        a transformer comprising a first end, a second end, and a third end, wherein the transformer has a non-isolation structure, the first end of the transformer is electrically coupled to the second output end of the input rectifier circuit, and the second end of the transformer is electrically coupled to the second end of the storage inductor;
        a switch electrically coupled to the third end of the transformer; and
        a rectifier component electrically coupled between the third end of the transformer and the load; and
    a control unit electrically coupled to the voltage conversion unit, wherein the control unit is configured to provide a control signal to the switch according to a switch current passing through the switch and at least one of the output voltage and the output current.

2. The voltage conversion device according to claim 1, wherein the transformer comprises:
    a first winding, wherein a first end of the first winding is electrically coupled to the second output end of the input rectifier circuit, and a second end of the first winding is electrically coupled to the second end of the storage inductor; and
    a second winding, wherein a first end of the second winding is electrically coupled to the second end of the first winding, and a second end of the second winding is electrically coupled to the switch;
    wherein the polarities of the second end of the first winding and the second end of the second winding are identical.

3. The voltage conversion device according to claim 2, wherein in each time period of the input voltage, a time duration of the input current passing through the storage inductor corresponds to a ratio of turns of the first and second windings.

4. The voltage conversion device according to claim 2, wherein a power factor of the voltage conversion device corresponds to a ratio of turns of the first and second windings.

5. The voltage conversion device according to claim 1, wherein the transformer comprises:
    a third winding, wherein a first end of the third winding is electrically coupled to the control unit, a second end of the third winding is electrically coupled to the ground end, the third winding couples to the first winding and the second winding, and the polarities of the second end of the first winding, the second end of the second winding, and the first end of the third winding are identical.

6. The voltage conversion device according to claim 5, wherein the third winding is configured to provide a second sensing signal to the control unit when a current passing through the first winding and a current passing through the second winding are equal to zero, so as to make the control unit accordingly provide the control signal to the switch.

7. The voltage conversion device according to claim 1, wherein the control unit comprises:
   a determining module configured to receive a first sensing signal, a second sensing signal, and a third reference voltage, and output a first trigger signal, wherein under a case that both of the first sensing signal and the second sensing signal are smaller than the third reference voltage, the first trigger signal has a high voltage level.

8. The voltage conversion device according to claim 7, wherein the control unit further comprises:
   an output module configured to receive the first trigger signal, and turn on the switch when the first trigger signal has the high voltage level.

9. The voltage conversion device according to claim 1, wherein the control unit comprises:
   an output module configured to receive a clock signal and output the control signal, which corresponds to a first trigger signal, according to the clock signal.

10. The voltage conversion device according to claim 1, wherein the control unit comprises:
    a comparator, wherein a first end of the comparator is configured to receive a second sensing signal corresponding to the switch current, a second end of the comparator is configured to receive a voltage threshold corresponding to a current threshold, an output end of the comparator is configured to output a second trigger signal, and under a case that the switch current is greater than the current threshold, the second trigger signal has a high voltage level.

11. The voltage conversion device according to claim 10, wherein the control unit further comprises:
    an output module configured to receive the second trigger signal, and turn off the switch when the second trigger signal has the high voltage level.

12. The voltage conversion device according to claim 10, wherein the control unit further comprises:
    an adjusting module configured to adjust the voltage threshold according to at least one of the output voltage and the output current.

13. The voltage conversion device according to claim 12, wherein the adjusting module comprises:
    a sensing circuit configured to determine whether at least one of the output voltage and the output current is greater than a predetermined threshold, and output a determining signal accordingly; and
    an adjusting circuit configured to adjust the voltage threshold according to the determining signal.

14. The voltage conversion device according to claim 13, wherein the adjusting circuit comprises:
    a voltage source;
    a current source;
    a transmitting component, wherein an anode end of the transmitting component is electrically coupled to the voltage source, and a cathode end of the transmitting component is configured to receive the determining signal and generate a coupling signal; and
    a receiving component, wherein a first end of the receiving component is electrically coupled to the current source, a second end of the receiving component is coupled to a ground, the receiving component is configured to change a voltage level of the first end of the receiving component corresponding to the coupling signal, and the voltage level of the first end of the receiving component corresponds to the voltage threshold.

15. The voltage conversion device according to claim 13, wherein the sensing circuit comprises:
    a first amplifier configured to receive a third sensing signal corresponding to the output current and a first reference voltage, and output a first amplifier signal;
    a second amplifier configured to receive a fourth sensing signal corresponding to the output voltage and a second reference voltage, and output a second amplifier signal; and
    an OR-gate circuit configured to receive the first amplifier signal and the second amplifier signal, perform a logic OR operation on the first amplifier signal and the second amplifier signal to select one of the first amplifier signal and the second amplifier signal, whichever has a lower voltage level, to serve as the determining signal.

16. The voltage conversion device according to claim 1, wherein the voltage conversion unit further comprises:
    an output capacitor electrically coupled between the second output end of the input rectifier circuit and the rectifier component.

17. The voltage conversion device according to claim 1, wherein the voltage conversion unit further comprises:
    an output-voltage-sensing unit configured to sense the output voltage to generate an output-voltage-sensing signal, and provide a fourth sensing signal to the control unit.

18. The voltage conversion device according to claim 1, wherein the voltage conversion unit further comprises:
    an output-current-sensing unit configured to sense the output current to generate an output-current-sensing signal, and provide a third sensing signal to the control unit.

19. The voltage conversion device according to claim 1, wherein the voltage conversion unit further comprises:
    a switch-current-sensing unit configured to sense the switch current to generate a second sensing signal, and provide the second sensing signal to the control unit.

20. The voltage conversion device according to claim 1, wherein the load is a light-emitting diode.

* * * * *